United States Patent [19]

Blackwell et al.

[11] Patent Number: 4,470,319

[45] Date of Patent: Sep. 11, 1984

[54] VALVE ACTUATING MECHANISM

[75] Inventors: Chester R. Blackwell; Christopher G. Pfaff, both of Houston, Tex.

[73] Assignee: Daniel Industries, Inc., Houston, Tex.

[21] Appl. No.: 284,074

[22] Filed: Jul. 16, 1981

[51] Int. Cl.³ .............. F16H 1/18; F16K 31/12; F16K 31/44; F01B 3/00
[52] U.S. Cl. .............. 74/424.8 VA; 74/89; 251/56; 251/229; 92/31
[58] Field of Search ........... 74/424.8 VA, 89, 99, 74/20; 251/56, 229, 58; 92/31

[56] References Cited

U.S. PATENT DOCUMENTS

| Re. 20,973 | 1/1939 | Goldberg et al. | 251/160 |
|---|---|---|---|
| Re. 22,455 | 3/1944 | Wilson | 74/22 |
| 925,448 | 6/1909 | Boyden | 74/586 |
| 2,531,905 | 11/1950 | Carpenter | 74/99 R |
| 2,569,850 | 10/1951 | Falconer | 74/99 R |
| 3,793,893 | 2/1974 | Heinen | 251/229 |
| 3,908,697 | 9/1975 | Witzel | 137/625.47 |
| 4,120,479 | 10/1978 | Thompson et al. | 251/56 |
| 4,133,215 | 1/1979 | Norris et al. | 74/89 |
| 4,149,561 | 4/1979 | Dalton | 251/229 |
| 4,293,117 | 10/1981 | Mueller | 251/229 |

Primary Examiner—Lawrence J. Staab
Assistant Examiner—Michael D. Bednarek
Attorney, Agent, or Firm—Gunn, Lee & Jackson

[57] ABSTRACT

A valve actuating mechanism for valves particularly of the plug valve type wherein a plug member is movable between operative positions by both linear and rotary movement. The valve actuating mechanism incorporates means for imparting linear movement to a valve stem and separate means for accomplishing 90° rotary movement to the valve stem during such linear movement. Rotary movement of the valve stem is accomplished by pivotal linkage means that is interconnected both with the valve stem and valve body structure by means of omni-directional pivots.

10 Claims, 5 Drawing Figures

VALVE ACTUATING MECHANISM

FIELD OF THE INVENTION

This invention is directed particularly to valve actuator mechanisms for accomplishing controlled positioning of plug valve elements and more particularly relates to valve actuator mechanisms for accomplishing both linear and rotary components of movement during valve actuation.

BACKGROUND OF THE INVENTION

Although tapered plug valves may be cycled for operation by simply rotating plug members between the open and closed positions thereof, such rotation may require application of considerable torque to a valve stem. In many cases, valve actuator mechanisms have been employed that have the capability of imparting both linear and rotary movement to the valve element so that the valve may be unseated prior to rotation thereby allowing rotation to occur through application of minimal torque forces. Examples of valve actuator mechanisms incorporating linear and rotary components of movement are identified by U.S. Pat. No. Re 20,973 of Goldberg, et al; U.S. Pat. No. Re 22,455 of Wilson; U.S. Pat. No. 3,793,893 of Heinen and U.S. Pat. No. 3,908,697 of Witzel. In most cases, valve actuator mechanisms for imparting linear and rotary movement to a plug valve member are of fairly complex and this type require guiding means such as guide pins and grooves to insure that axial movement and rotational movement do not occur simultaneously so that accurate positioning of the valve element may be controlled. It is desirable to provide a valve actuating mechanism which is of simple and relatively inexpensive nature and yet which is capable of accomplishing accurate positioning of the valve element without any requirement for positive stem guide structure.

A problem that typically occurs when valve actuator mechanisms are employed that induce both liner and rotary components of movement to valve mechanisms, is the inability of such mechanisms to control such movement during all phases of valve actuation. In many cases, at the intermediate portions of rotary and linear movement, interacting mechanical parts become loose and a valve mechanism can be rotated by line pressure irrespective of the position of the valve actuator. This activity is typically known as "windmilling". In fact, a valve windmilling effect can be developed such that forces developed by the pressure of flowing fluid suddenly rotate the valve element through several degrees of free movement due to slack in the actuating mechanism. After this slack has been taken up by rotational movement, the valve actuator mechanism will then restrain the valve mechanism against further rotation. The valve element, however, slams from one position to another and this slamming force is introduced through the valve stem and into the valve actuating assembly. Under conditions where this windmilling induced slamming phenomena occurs, a valve actuating mechanism can become worn quite quickly to the extent that operational failure occurs. It is desirable, therefore, to provide a valve actuating mechanism which enables the provision of completely controlled movement during all phases of both linear and rotational increments of movement. Further, it is desirable to provide a valve mechanism that simultaneously introduces both linear and rotary components of movement to a valve stem for controlling actuation of a valve mechanism or other suitable mechanical device.

SUMMARY OF THE INVENTION

It is a primary feature of this invention to provide a valve actuator mechanism having the capability of simultaneously introducing both linear and rotary components of movement to a plug valve mechanism in order to actuate the same between the open and closed positions thereof.

It is also a feature of this invention to provide a novel valve actuating mechanism incorporating a pair of opposed pivotal link elements that establish movement interconnection between a valve actuator mechanism and a valve stem for the purpose of inducing both linear and rotational movement of a valve mechanism upon introduction of simple linear movement to a valve stem.

It is an even further feature of this invention to provide a novel valve actuating mechanism that provides sufficiently controlled movement of a valve actuating mechanism during all phases of movement thereof and does not allow windmilling of the valve element responsive to pressure induced forces during opening and closing movement.

Among the several features of this invention is contemplated the provision of a novel valve actuator mechanism that eliminates any necessity for provision of arcuate slots and linear grooves that provide control functions for arcuate and linear movement of a valve mechanism.

It is also a feature of the invention to provide a novel valve actuating mechanism that is of simple nature, is low in cost and reliable in use.

Other and further objects, advantages and features of the present invention will become apparent to one skilled in the art upon consideration of this entire disclosure. The form of the invention, which will now be described in, detail illustrates the general principles of the invention but it is to be understood that this detailed description is not to be taken as limiting the scope of this invention.

In accordance with the invention, a valve actuating mechanism is provided which is employed under circumstances where a tapered plug valve element is to be lifted for unseating and rotated 90° to the open or closed position thereof. The valve actuator mechanism hereof is enabled to accomplish simultaneous lifting and rotation of a tapered plug valve element during operation thereof. The actuator mechanism incorporates a base structure that is adapted to be retained in fixed relation with a valve body structure thus defining a stable base. The base structure is formed to define a centralized opening through which a valve stem extends. The valve stem is capable of both rotary and linear movement with respect to the base structure. The base structure also defines a pair of opposed connector elements that are positioned on either side of the centralized opening. Universal connection devices are supported by each of the connector elements and are also immovable with respect to the actuator base structure.

The valve stem or actuator stem extending upwardly from the valve element through the valve body and through the centralized opening of the actuator base structure, is also provided with universal connector elements in fixed relation therewith. These universal connector elements, like those positioned in fixed relation with the base structure, may be of generally spherical nature or of other suitable configuration that allows omni-directional movement to occur between connected elements. The connecting links, being connected for universal movement to both the valve actuator base structure and the movable actuator stem, serve also to maintain a fixed distance between the points of connection with the actuator base structure and actuator stem. At one extremity of valve movement, the connector links will be positioned in substantially normal relation with the axis of the valve stem and in the opposite position will be positioned in upstanding relation with the axis thereof slightly inclined with respect to the axis of the actuator stem. Although the distance between the points of connection of the connector links with the actuator base and actuator stem are of fixed nature when in use, the connector links employ adjustment mechanisms to enable the distance between the points of connection to be adjusted as appropriate for accurate positioning of the valve element in each of the positions thereof. The connector links are also arranged such that an imaginary line extending between the points of connection does not coincide or become parallel with the axis of the actuator stem. Therefore, the connector links cannot become positioned in such a manner as to lock the actuator assembly against linear movement.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiment thereof which is illustrated in the appended drawings, which drawings form a part of this specification. It is to be noted, however, that the appended drawings illustrate only a typical embodiment of the invention and are not to be considered limiting of its scope, for the invention may admit to other equally effective embodiments.

IN THE DRAWINGS

Figure 1:
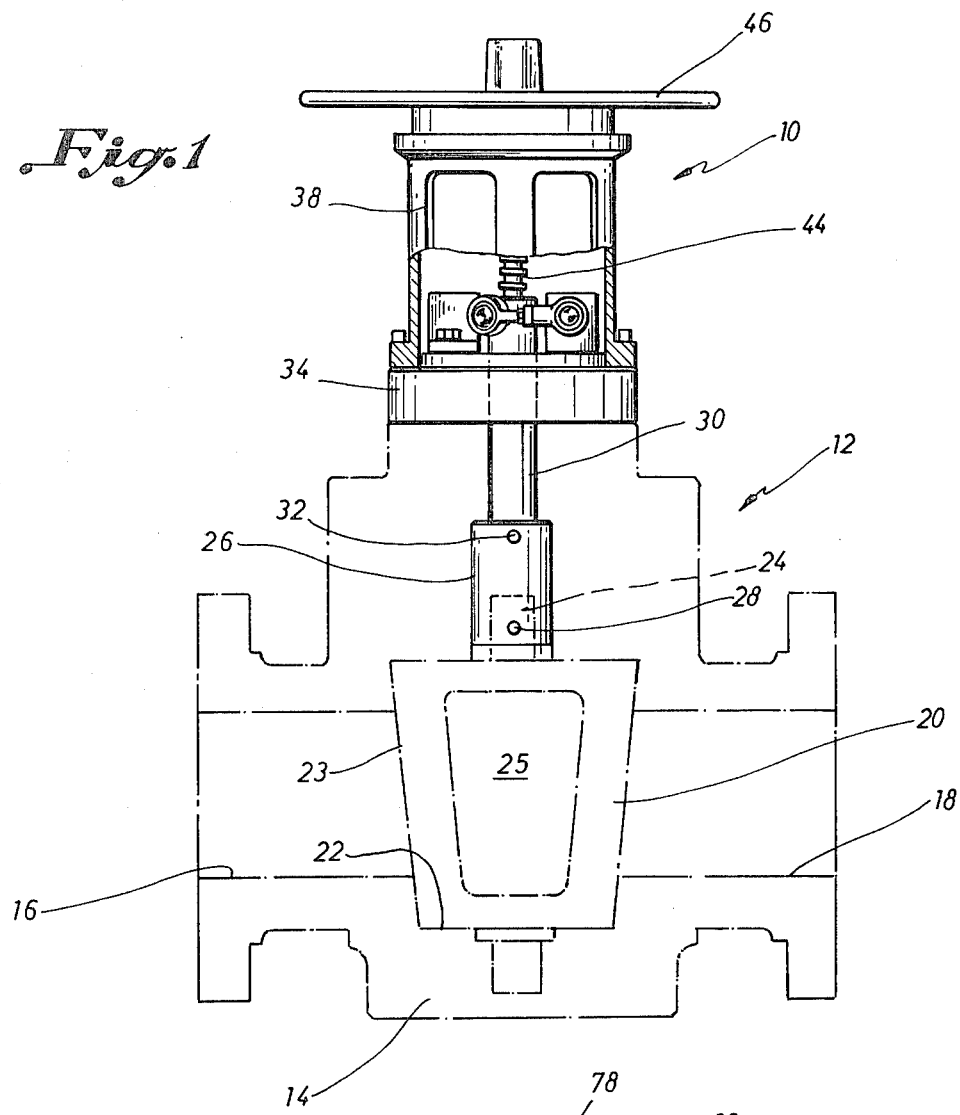

FIG. 1 is an elevational view having parts thereof cut away and shown in section, illustrating a quarter turn valve actuating mechanism constructed in accordance with this invention and being shown in assembly with a plug valve mechanism shown partly in phantom lines.

Figure 2:
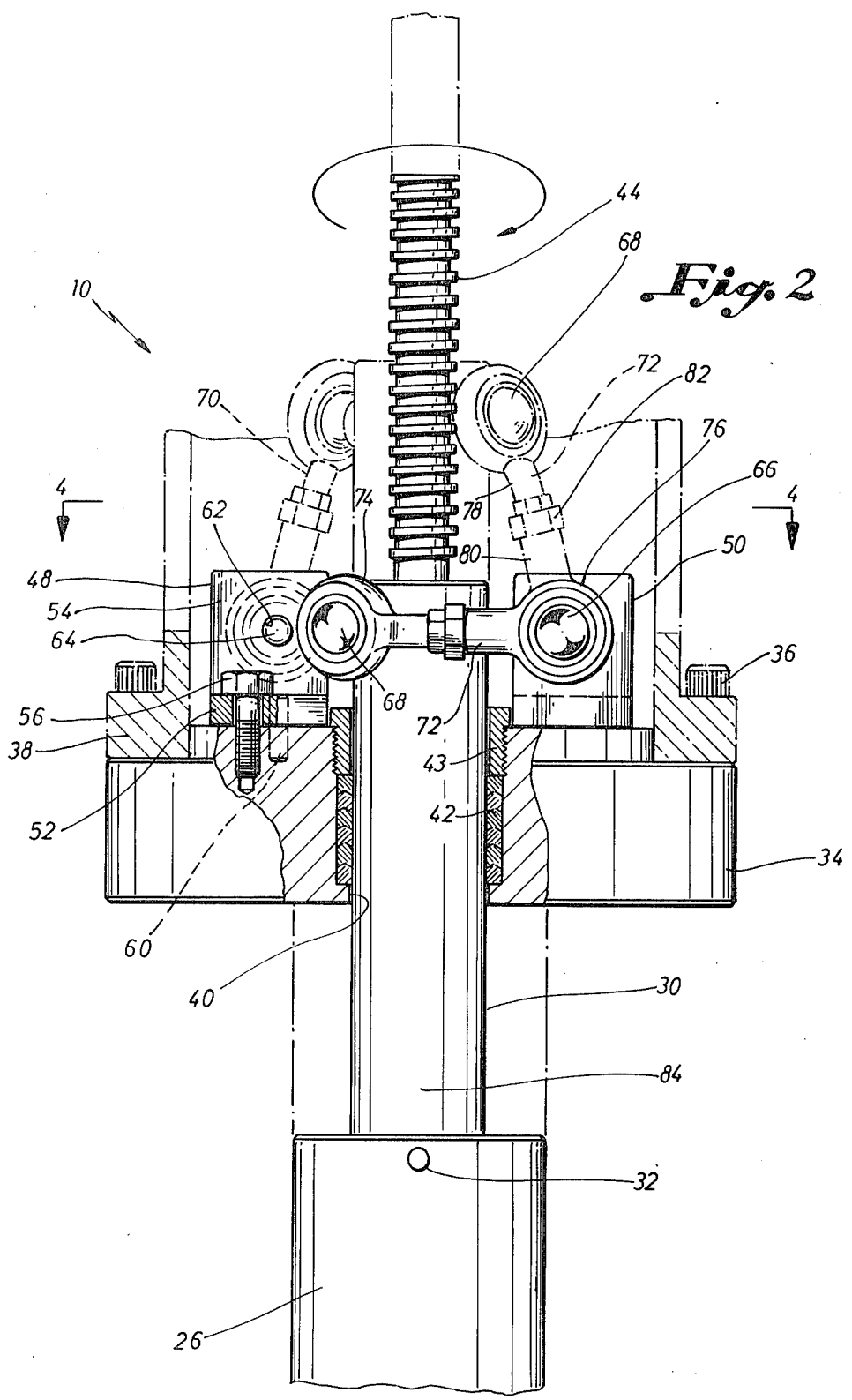

FIG. 2 is a partial elevational view of the valve actuator mechanism of FIG. 1 having parts thereof broken away and shown in section for the purpose of exposing internal parts and further illustrating the positions of the connector links with the actuator stem positioned at the respective limits of its linear travel.

Figure 3:
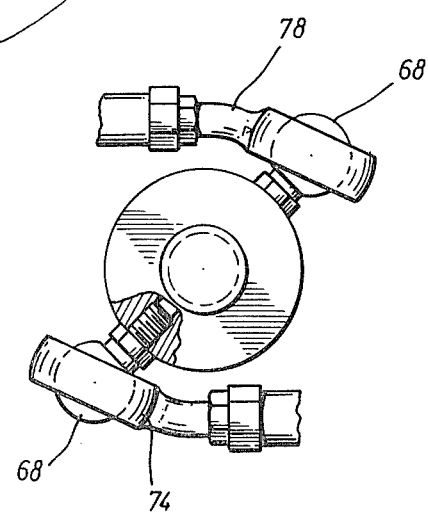

FIG. 3 is a partial plan view of the connector links and actuator stem, illustrating the relationship thereof in the full line position of FIG. 2.

Figure 4:
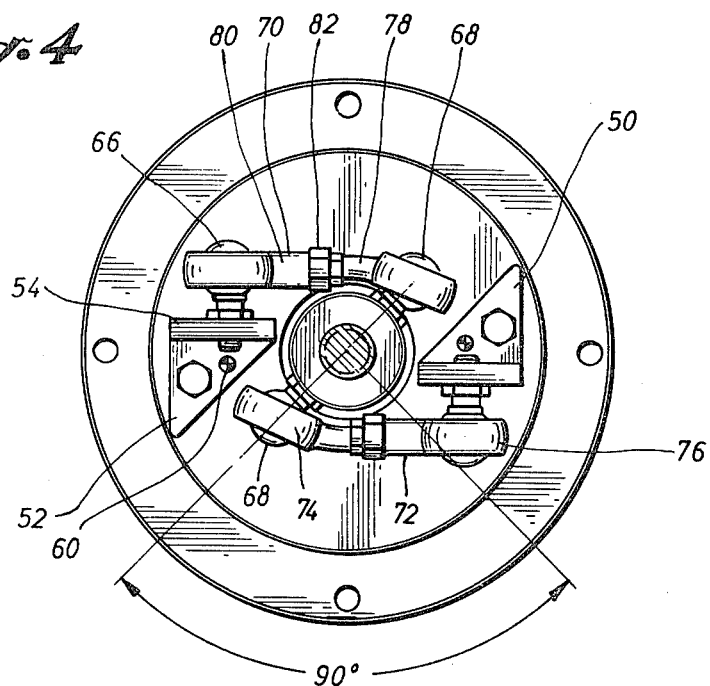

FIG. 4 is a sectional view taken along line 4—4 of FIG. 3 which illustrates the positions of the connector links and valve actuator stem in the full line position of FIG. 2.

Figure 4A:
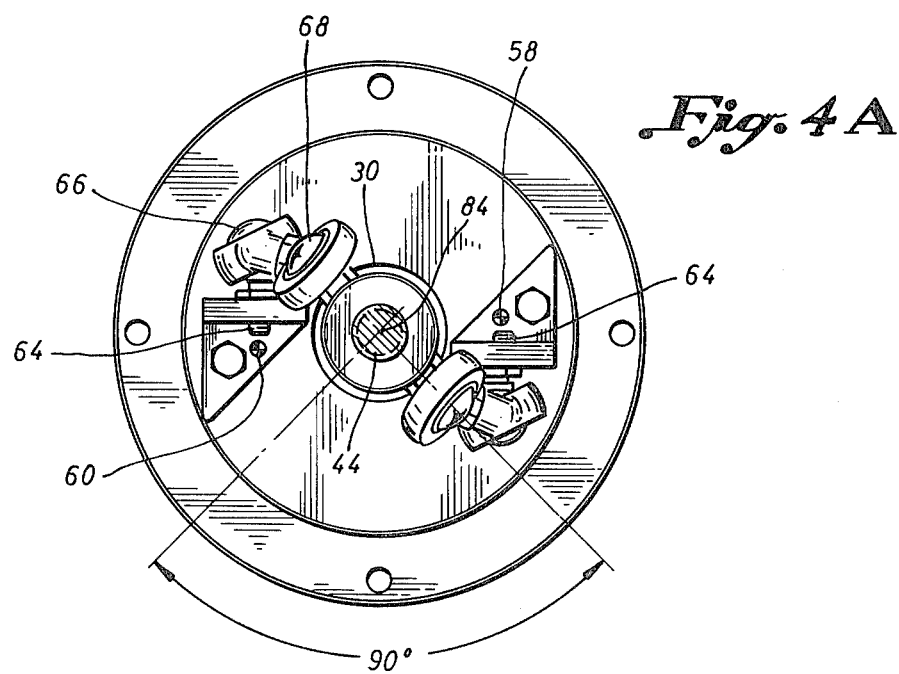

FIG. 4A is another sectional view taken along the line 4—4 of FIG. 2 which illustrates the positions of the connector links and valve actuator stem in the broken line position of FIG. 2.

DETAILED DESCRIPTION OF PREFERRED EMBODIMENT

Referring now to the drawings and first to FIG. 1, there is shown a valve actuating mechanism generally at 10 which is constructed in accordance with the present invention and which is shown in operative assembly with a plug valve illustrated in broken lines generally at 12. The plug valve incorporates a valve body 14 defining inlet and outlet flow passages 16 and 18 that intersect a valve chamber 20. A tapered valve plug element 22 is positioned within the valve chamber 20 and is capable of being rotatably positioned to the open or closed positions thereof to control the flow of fluid through the flow passages 16 and 18.

As mentioned above, rotation of the plug member in its fully seated position can require excessive torque and can cause excessive wear of the valve mechanism. It is desirable, therefore, to accomplish unseating of the plug member prior to its rotation between the open and closed positions thereof. A mechanism for accomplishing linear unseating movement of the plug member 22 and for accomplishing 90° rotation of the plug member in response to application of simple linear force to an actuator stem may conveniently take the form illustrated in the drawings. The plug member 22 is provided with a connector projection 24 that is adapted to be received within a connector element 26 and locked in nonrotatable assembly with the connector element by means of a connector pin 28 or any other suitable locking device. The connector element 26 is also formed to receive the lower extremity of a valve actuator stem 30 and is secured to the connector element 26 by means of a connecting pin 32 or any other suitable locking device. It is also practical to form the valve actuator stem 30 integrally with the rotatable plug member 20, thus eliminating the need for a connector element such as that shown at 26. For purpose of this discussion therefore, the term valve actuator stem is intended to include valve stems that are connected to the valve element, as shown, and integral valve and actuator stem assemblies such as when the valve and valve stem are welded together. The valve actuator mechanism incorporates a base structure 34 which is adapted to be secured to the upper portion of the valve body 14 in any suitable manner. If desired, the base structure 34 may be so formed as to define the bonnet portion of the valve thus forming a closure for the valve chamber 20. The base structure 34 may be secured to the upper portion of the valve body in any suitable manner such as by bolted or threaded connection or by any other suitable form of connection. It is necessary only that the base structure 34 remain in substantially fixed relation with the valve body structure 12. The base structure 34 is also formed to define internally threaded apertures that receive a plurality of bolts or cap screws 36 that secure a valve actuator housing 38.

With reference to FIG. 2, the actuator base structure 34 defines a centrally located opening or passage 40 which is lined by means of a stem packing assembly 42 through which a cylindrical portion of the valve actuator stem extends in sealed engagement. The packing assembly 42 serves as a guide to maintain proper orientation and stability of the valve stem 30 as it moves linerally with respect to the base structure 34. The packing assembly is retained in place within a stuffing box or packing chamber by means of a retainer element 43 that is threaded or otherwise secured to the base structure 34. The upper portion of the valve stem 30 is formed to define an externally threaded portion 44 which is received by any suitable drive mechanism located at the upper portion of the actuator housing 38. As shown in FIG. 1, one simple form of drive mechanism may be a hand wheel actuator drive 46 that rotates a drive nut that is in threaded engagement with the threaded portion of the valve actuator stem. The drive nut typically has a fixed or nonrotatable relation with respect to the hand wheel or other nut rotating device or, in some cases, may have a geared relationship therewith. Obviously, any suitable stem actuating device may be employed having the capability of imparting simple linear movement to the valve actuator stem. The valve actuator stem must have some degree of rotational capability for the reason that the plug valve member 22 is rotated 90° by the valve actuating stem during linear movement of the valve actuating stem.

As mentioned above, it is desirable to facilitate 90° rotary movement of the valve actuator stem and valve element during linear movement of the actuating stem from the open or closed positions thereof. According to the present invention, a mechanism for accomplishing 90° rotation of the actuator stem 30 may conveniently take the form shown in the drawings. To the base structure 34 is connected a pair of opposed, generally identical connector bracket elements 48 and 50. Each of the connector brackets incorporates a connector flange portion 52 having an upstanding connector tab 54 extending upwardly therefrom and formed integrally therewith. The connector flange portions of each of the connector bracket elements defines an aperture through which a connector bolt 56 extends for the purpose of locking the connector bracket element with respect to the base structure 34. As is evident from FIG. 4A. Each of the flange portions 52 of the connector bracket elements is also formed to define an aperture 58 through which a positioning pin 60 extends for the purpose of retaining the respective bracket elements in properly oriented relation with respect to the actuator base structure. Each of the upstanding connector tabs 54 defines a threaded aperture 62 within which is received the externally threaded connector portion 64 of a spherical pivot or connector element 66. The spherical pivot is maintained in fixed relationship with the upstanding connector tab and is, therefore, also fixed in relationship to the base structure 34. A pair of similar spherical pivot connector elements 68 are also connected in fixed relation to opposed sides of the actuator stem 30. The spherical pivot connector elements 68 may be identical as compared to the spherical pivot connector elements 66 if desired. In such case, opposed internally threaded apertures will be formed in the upper portion of the lower cylindrical section of the valve stem. Externally threaded connector portions such as shown at 64 will be received within the internally threaded apertures with sufficiently tight fit to retain the spherical connector elements 68 in substantially immovable relationship on opposed sides of the valve actuator stem.

A pair of connector elements 70 and 72 are employed to maintain a constant distance between the spherical pivot connector elements 66 and 68. Each of the connector elements 70 and 72 may be of generally identical nature, incorporating receptacle portions 74 and 76 at opposite extremities thereof within which are received the spherical pivot connector elements 68 and 70. Connection between each of the receptacles 74 and 76 with respective ones of the spherical pivot connector elements is in the form of a ball and socket connection that allows universal movement between the connecting parts. Shaft means structurally interconnects the socket receptacle portions 74 and 76 and establishes a fixed relationship therebetween.

Because it will be desirable to provide adjustment of the distance between the spherical pivot connector elements to accommodate accurate positioning of the valve element in the open and closed positions thereof, each of the connector links 70 and 72 may have some degree of linear adjustment. In one suitable form, the connector links may comprise internal and external telescoping link members 78 and 80 and an adjustment element 82 of any suitable nature may be employed to adjust the telescoping relationship of the connector link portions. Thus, the length of the connector links may be adjusted to accommodate manufacturing tolerances and thus achieve accurate positioning of the valve element in the open and closed position thereof. The connector links, however, remain of fixed length during operation of the valve actuator mechanism.

As is evident from the operational FIGS. 4 and 4A, the internal connector link portion 78 may be slightly curved, thus slightly angulating the socket or spherical receptacle 74 with respect to the opposite socket or spherical receptacle 76. By such angulation, the spherical pivot connector elements 68 may be positioned quite close to the center-line 84 of the valve actuating stem without causing the connecting link portion thereof to contact the actuator stem or otherwise interfer with operation of the actuator mechanism. This feature also promotes full 90° rotation of the actuator mechanism during operation thereof.

As is evident particularly in FIGS. 2, 4 and 4A, the connector links 70 and 72 maintain a fixed distance between the spherical pivot connector elements 66 and 68 during all phases of linear movement of the valve actuator stem 30. As shown in full line in FIG. 2, and representing the position illustrated in FIG. 4, the valve actuator stem 30 is in its lowermost position and the connector links 70 and 72 are positioned in generally horizontal oriented manner such that a line extending between the center points of spherical pivot connector elements 66 and 68 will be disposed in substantially normal relationship with respect to the center-line 84 of the valve actuator stem. Also, as shown in FIG. 1, with the valve actuator stem 30 in its lower most position, the valve element 22 will be fully seated within the valve chamber 20, thus causing the blocking portion 23 of the valve element to block the flow of fluid through the flow passages 16 and 18. In this closed and seated position, the flow port 25 of the valve element will be oriented out of communication with the flow passages. When it is desired to open the valve, the hand wheel 46 or any other suitable actuating device may be energized such as to impart linear movement to the valve actuating stem. As mentioned above, where a manual hand wheel operator is employed, such as shown in FIG. 1, a drive nut received by the threaded portion 44 of the actuator stem will be rotated by the hand wheel, thus interacting with the threaded portion of the actuator stem and moving the actuator stem in linear manner. For opening the valve, the actuator stem is moved linearly in an upward direction. As the actuator stem 30 is moved upwardly, the spherical pivot connector elements 68 also are moved upwardly along with the actuator stem. Since the distance between the spherical connectors 66 and 68 is fixed, this upward movement results in universal pivoting movement between the spherical connectors and the respective receptacles at each end of the connector links. Thus, the connector links are pivoted upwardly toward the broken line position shown in FIG. 2 and the position shown in FIG.

4A. As the connector links are pivoted upwardly, the distance between the spherical connectors remains fixed and thus, the actuator stem 30 must rotate. After the actuator stem has been rotated 90° to the broken line position of FIG. 2 and the position of 4A, the valve element 22 will have been rotated 90° and will have been moved upwardly along with the valve actuating stem 30. In some cases, the tapered plug element 22 may define a flow port of considerably greater length as compared to the diameter of the openings defined by the flow passages 16 and 18. In such case, a plug valve element may be provided having a central flow port that is positioned in registry with the flow passages in the open or raised position of the valve element and may define opposed blocking portions that block the flow of fluid in the downward or seated position of the valve element. It is not intended, therefore, to limit the present invention solely to plug valve structures of the specific nature illustrated at 12 in FIG. 1.

When it is desired to move the valve element 22 from its open position to the closed position thereof, the hand wheel structure 46 will be reversed, thereby imparting downward movement to the valve actuator stem 30. As the stem 30 moves downwardly, the connector links will maintain a fixed distance between the spherical connector elements, thus causing the valve actuator stem to counterrotate 90° as the actuator stem 30 is processed linearly to the full downward position thereof. It should be borne in mind that the rate of rotation of the valve element, as compared to linear travel, varies due to the angular relationship of the connector links with respect to the axis of the valve actuating stem. Thus, initial upward movement of the valve actuating stem and valve accomplishes only minimal rotation of the plug member 22. The rate of rotation increases as the valve actuator stem approaches its uppermost position such that the maximum rate of rotation is achieved at the upper limit of actuator stem travel. For this reason, the plug element 22 is unseated by vertical movement thereof with only minimal rotation and thus the seals of the valve mechanism are subjected to minimal wear as the unseating movement occurs. At the upper limit of its travel, the valve element 22 is not in contact with the internal seat structure of the valve mechanism and thus a maximum rate of rotation may be accomplished at minimal torque.

While the foregoing is directed to the preferred embodiment of the present invention, other and further embodiments of the invention may be devised without departing from the basic concept thereof, and the scope thereof is determined by the claims which follow.

We claim:

1. A valve actuator mechanism for accomplishing linear and rotary movement of a valve stem, said valve actuator mechanism comprising:
   (a) an actuator base structure being disposed in fixed relation with said valve;
   (b) a valve actuator stem extending through said actuator base structure and being capable of linear and rotary motion relative thereto, said valve actuator stem being in substantially fixed relation with said valve stem;
   (c) first spherical pivot connection means being secured in immovable relation to said actuator base structure;
   (d) second spherical pivot connection means being secured in immovable relation with said valve actuator stem;
   (e) linear actuator means being interconnected with said actuator base and with said valve stem, said linear actuator means, upon being energized, imparting linear movement to said valve stem and allowing rotational movement of said valve stem; and
   (f) a plurality of elongated rotational control links extending between said first and second spherical pivot connection means, said rotation control links having spherical connection receptacles at the extremities thereof receiving said first and second spherical pivot connection means and establishing omnidirectional pivot interconnection therewith, the length of said rotational control links being adjustable for valve alignment and remaining fixed during use of said valve actuator mechanism, upon linear movement of said valve stem by said linear actuator means said rotational control links pivoting about said first and second spherical pivot connection means and inducing substantially 90° rotational movement to said valve actuator stem and said valve stem.

2. A valve actuator mechanism as recited in claim 1, wherein
   the length of said linkage element remains unchanged during linear and rotational movement of said valve stem.

3. A valve actuator mechanism as recited in claim 1, wherein:
   (a) said first pivot means is a generally spherical joint having ball and socket portions, said ball portion being interconnected with one of said actuator base structure and linkage element and the socket portion being interconnected with the other of said actuator base structure and linkage element; and
   (b) said second pivot means is a generally spherical joint having ball and socket portions, said generally spherical portion being interconnected with one of said valve stem and linkage element and said socket portion being interconnected with the other of said valve stem and linkage element.

4. A valve actuator mechanism as recited in claim 1, wherein
   said rotational control links are in compression during rotational movement of said valve stem in one direction and in tension during rotational movement of said valve stem in the opposite direction.

5. A valve actuator mechanism as recited in claim 5, wherein said rotational control links each include:
   (a) a first generally spherical pivot element being interconnected in fixed relation to said actuator base structure;
   (b) a second generally spherical pivot element being interconnected in fixed relation with said valve stem; and
   (c) said linkage element defining first and second pivot socket means receiving said first and second spherical pivot elements, respectively.

6. A valve actuator mechanism for accomplishing linear and rotary movement of a valve stem, said valve actuator mechanism comprising:
   (a) an actuator base structure being disposed in fixed relation with said valve;
   (b) a valve actuator stem extending through said actuator base structure and being capable of linear and rotary motion relative thereto, said valve actuator stem being in substantially fixed relation with said valve stem;

(c) linear actuator means being interconnected with said actuator base and with said valve stem, said linear actuator means, upon being energized, imparting linear movement to said valve stem and allowing rotational movement of said valve stem;

(d) first spherical pivot connection means being secured in immovable relation to said actuator base structure;

(e) second spherical pivot connection means being secured in immovable relation with said valve actuator stem;

(f) a pair of elongated connector link elements extending between said first and second spherical pivot connection means and having spherical socket connections at the ends of said connector link elements receiving said first and second spherical pivot connection means in omnidirectional pivotal relation therewith, said connector links maintaining a fixed distance between said spherical pivot connection means during said linear movement of said valve actuator stem and inducing 90° rotational movement to said valve actuator stem during said linear movement thereof, the length of said connector link elements being adjustable for valve alignment and remaining fixed during use of said valve actuator mechanism.

7. A valve actuator mechanism as recited in claim 6, wherein each of said connector link elements comprise:

(a) a pair of telescopically related elongated members, said connector receptacle elements being provided on respective ones of said elongated members; and (b) adjustment means securing said elongated members in assembly and being adjustable to adjust the combined length of said elongated members.

8. A valve actuator mechanism as recited in claim 1, wherein:

(a) connector bracket means is secured in immovable relation with said actuator base structure and defines upstanding tab means;

(b) one of said spherical connector elements is secured in substantially fixed relation with said upstanding tab means; and (c) the other of said spherical connector elements is connected in substantially fixed relation to said valve actuator stem.

9. A valve actuator mechanism as recited in claim 7, wherein:

each of said connector links is of a configuration positioning said connector receptacles in angular relation with one another.

10. A valve actuator mechanism as recited in claim 9, wherein:

each of said connector links is formed to define a bend intermediate said connector receptacles.

* * * * *